L. H. PLAUCHÉ.
EDUCATIONAL TOY.
APPLICATION FILED MAY 31, 1919.
1,330,089.
Patented Feb. 10, 1920.
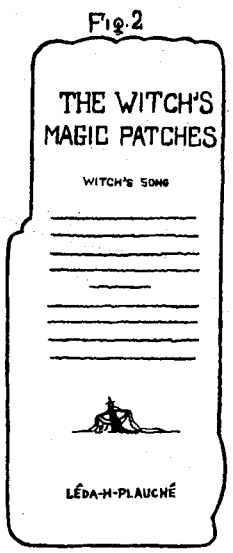
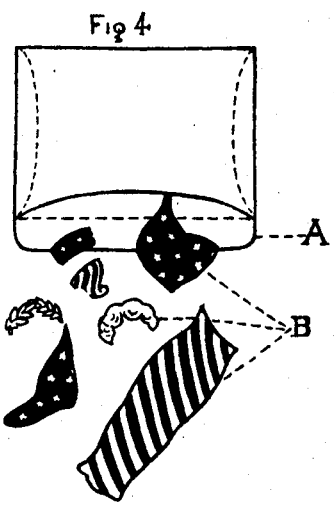
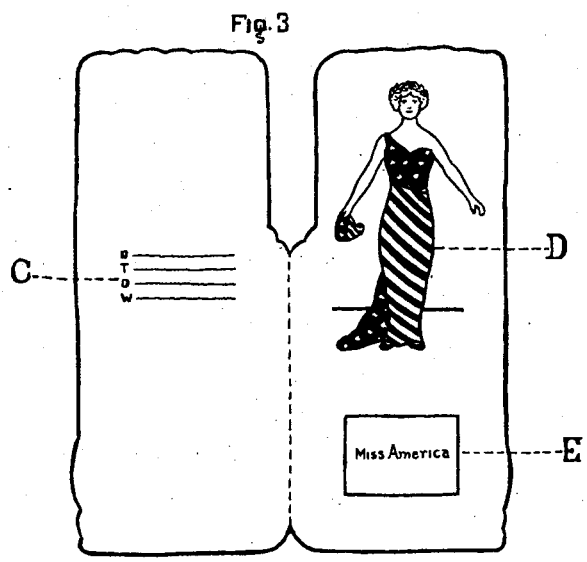

UNITED STATES PATENT OFFICE.

LEDA H. PLAUCHÉ, OF NEW ORLEANS, LOUISIANA.

EDUCATIONAL TOY.

1,330,089.　　　　Specification of Letters Patent.　　Patented Feb. 10, 1920.

Application filed May 31, 1919. Serial No. 300,899.

*To all whom it may concern:*

Be it known that I, LÉDA H. PLAUCHÉ, a citizen of the United States of America, residing at New Orleans, parish of Orleans, and State of Louisiana, have invented certain new and useful Improvements in Educational Toys, of which the following is a specification.

This invention relates to a new and useful improvement in educational toys, having for its purpose, the training of the young mind to concentrate on what it is engaged upon, by properly assembling correct colors of objects, offering to the child a convenient way in which to do this, and guarding against loss of the material to be used.

A further object of this invention is to provide means whereby the retentive faculty of the mind of a child may be developed by the reading or hearing read of verses of a descriptive character associated with physical effort and visual observation during the course of development of the picture.

To use my invention, material already prepared, is placed in a container attached to the drawing which is to be colored. The model is preferably made in book form, although I do not limit myself to this precise form. The preferred embodiment of my invention, consists in ten or more unicolored sheets, which will be considered a series, upon which are outlined drawings in black and white, of miscellaneous subjects, suitable to that series in which respective drawings will be included. In a container or receptacle, preferably attached at the bottom of the page, but to which position and design I do not limit myself, are placed patches already produced from variously colored paper or other suitable material and cut to fit different parts of the picture to be colored. The backs of the colored patches can be coated with adhesive, preferably of that character used on postage stamps. On the page opposite pictures, a descriptive verse or tale is printed.

This method of coloring pictures teaches the very young children as well as the older ones, the proper relation of elementary colors, so that it is not left to inexperienced little ones to select their own colors and make inharmonious combinations. My method also has the advantage of teaching neatness and exactness, two qualities which every mother likes to have developed in children, whereas according to the methods heretofore employed it is left to the children to cut out their own material or use paints or crayons, so that they are discouraged with the final result because by reason of their inexperience and lack of concentration they are not able to follow an outline perfectly with scissors, brush or crayon. According to my method the patches are already cut and the colors selected, leaving it to them to compare and properly fix the patches to the picture and thus teaching them how to assimilate objects of like shapes.

In the accompanying drawing which forms part of this specification,

Figure 1, shows the cover used when the invention is assembled in book form, and in the present instance shows a witch gathering leaves from the trees overhead, dropping them into her steaming caldron, and by means of magic words changing them to the "magic patches." The wise old owl looking on is in his wisdom fully aware of the joy she is preparing for those who will possess and use this educational toy. It is proposed to use the same cover on each successive series, simply changing contents of different series.

Fig. 2, shows a black and white reproduction of the title page—upon which appears the title and "the witch's song"— and a verse telling the children what she is doing, and after explaining how her magic patches happen to be in the containers, she gives directions of how to use the patches.

Fig. 3, represents a face view of the book in open condition. Here D, indicates a black and white picture of an original conception of "Miss America". Below, on same sheet, E indicates a container for patches, in this case an envelop. On the opposite page C indicates the descriptive printed matter, which tends to stir the patriotism of the child. In like manner, throughout the book, other pictures are accompanied by printed matter.

Fig. 4, represents the container, shown, for the purpose of better illustration upon a larger scale than in the outer figures. This container is for holding the different colored patches which are to be used in developing the accompanying picture. As here shown, an envelop is attached to the bottom of the sheet, but to which position and design I do not limit myself, since a change of position and design will at times be necessary to properly suit the picture. A indicates a narrow flap by which means the container is attached to the sheet. B indicates patches cut out of variously colored paper so as to match the shapes of different parts of the accompanying picture, and having adhesive on their backs by the moistening of which the patch is secured to the base D shown in Fig. 3. For example the envelop accompanying the picture "Miss America" shown in Fig. 3, would contain blue patches with white stars thereon to be applied respectively to the waist, train, and lower portion of cap; patches with red and white stripes to be applied to skirt and upper portion of cap; a patch of yellow for hair; a patch of green for laurel wreath by which she is represented as having replaced her cap. Therefore, it will be noted, that parts of the design, such as face, hands, and shoes remain uncolored by patches so that the patches could not be cut out by superposing sheets of different material of separate colors, or sheets of like material but of separate colors. My invention provides a neat, attractive and easy way for coloring pictures, as I avoid making a colored picture by mutually fitting outlines, after the original design has been cut up to make the patches, where if the child is inexperienced in the handling of scissors and clips off more or less than it should it is impossible to truly fit in the mutual outlines.

Having fully described my invention I claim:

1. In an instruction book comprising a plurality of pages, a page having imprinted thereon the outline of a figure to be characterized, a plurality of patches so formed and colored as to characterize the outline of the figure when properly placed thereon, a pocket attached to said page, and a printed description, said patches being so related to the descriptive matter as to furnish, when placed in order, the subject-matter of such description.

2. In an instruction book comprising a plurality of pages, a page having imprinted thereon the outline of a figure to be characterized, a plurality of patches so formed and colored as to characterize the outline of the figure when properly placed thereon, a pocket attached to said page, and a printed description, said patches being so formed that any misplacement relative to one another results in noticeable distortion of said outline.

3. An instruction book comprising a plurality of normally facing pages, one leaf bearing an outline of a figure to be characterized, the other bearing suitable descriptive matter, a plurality of patches so formed and colored as to characterize the figure when placed thereon and whose contours are so related one to the other that no misplacement of the patches can be made upon the figure without distortion of the outline thereof and which, when placed in position, have a definite correlation with and furnish the basis for the particular description set forth on the facing page.

In testimony whereof I have hereunto set my hand in presence of two subscribing witnesses.

LÉDA H. PLAUCHÉ.

Witnesses:
WM. J. EVANS,
W. H. COOK.